(12) United States Patent
Hebbale et al.

(10) Patent No.: US 6,193,626 B1
(45) Date of Patent: Feb. 27, 2001

(54) POWERTRAIN WITH A MULTI-SPEED TRANSMISSION

(75) Inventors: Kumaraswamy V. Hebbale; Sekhar Raghavan; Patrick Benedict Usoro, all of Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/442,308

(22) Filed: Nov. 22, 1999

(51) Int. Cl.$^7$ ........................................................ F16H 3/62
(52) U.S. Cl. ............................................. 475/284; 475/325
(58) Field of Search .................................. 475/280, 284, 475/325, 121, 122, 123; 477/143

(56) References Cited

U.S. PATENT DOCUMENTS

| | | | |
|---|---|---|---|
| 2,873,625 | * 2/1959 | Simpson | 475/284 |
| 3,946,623 | * 3/1976 | Murakami et al. | 475/280 |
| 5,141,477 | * 8/1992 | Oshidari | 475/280 |
| 5,393,279 | * 2/1995 | Bota et al. | 477/143 |
| 5,567,201 | * 10/1996 | Ross | 475/280 |
| 5,830,102 | * 11/1998 | Coffey | 475/285 |

* cited by examiner

Primary Examiner—Sherry Estremsky
(74) Attorney, Agent, or Firm—George A. Grove

(57) ABSTRACT

A powertrain has an engine, torque converter and a multi-speed transmission. The multi-speed transmission has a planetary gear arrangement disposed between an input shaft and an output shaft. The planetary gear arrangement consists of a simple planetary gear set and a compound planetary gear set that are interconnected and controlled by six torque transmitting mechanisms to provide six forward speed ratios and a reverse speed ratio between the input shaft and output shaft. Each of the torque transmitting mechanisms is engaged during at least two of the speed ratios. One of the torque transmitting mechanisms is established during six of the speed ratios including the reverse speed ratio.

5 Claims, 1 Drawing Sheet

| GEAR | RATIO | 24 | 26 | 28 | 30 | 32 | 34 |
|---|---|---|---|---|---|---|---|
| REV | -2.63 |  |  | X | X |  | X |
| 1st | 4.56 |  | X | X |  |  | X |
| 2nd | 2.58 | X |  | X |  |  | X |
| 3rd | 1.98 |  | X | X |  | X |  |
| 4th | 1.44 | X |  | X |  | X |  |
| 5th | 1.00 | X |  | X | X |  |  |
| 6th | 0.73 | X |  |  | X | X |  |

X = ENGAGED

US 6,193,626 B1

POWERTRAIN WITH A MULTI-SPEED TRANSMISSION

TECHNICAL FIELD

This invention relates to powertrains having multi-speed power transmissions and more particularly to power transmissions having at least five forward speeds.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently, many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained.

A six speed planetary transmission having two simple planetary gear sets is disclosed in U.S. Pat. No. 09/383,429 filed Aug. 27, 1999 and assigned to the assignee of this application. Other six speed planetary transmissions having a simple planetary gear set and a compound planetary gear set are disclosed in co-pending U.S. Ser. Nos. 09/442,310 filed Nov. 22, 1999, Ser. No. 09/442.309 filed Nov. 22, 1999, and Ser. No. 09/442,307 filed Nov. 22, 1999.

SUMMARY OF THE INVENTION

It is an object of the present invention to provide an improved powertrain with a planetary transmission having six forward speeds.

In one aspect of the present invention, a planetary gear arrangement has a simple planetary gear set and a compound gear set that are interconnected. In another aspect of the present invention, the ring gear member of the simple planetary gear set is continually drivingly connected with the transmission output shaft. In yet another aspect of the present invention, the sun gear member and the ring gear member of the compound planetary gear set are individually selectively connectable with the input shaft by way of selectively operable torque transmitting mechanisms.

In still another aspect of the present invention, using two interconnecting selectively operable torque transmitting mechanisms, the ring gear member and the carrier assembly member of the simple planetary gear set are selectively connectable with the ring gear member of the compound planetary gear set. In a further aspect of the present invention, two additional torque transmitting mechanisms cooperate with the abovementioned four torque transmitting mechanisms to establish six forward speed ratios and one reverse speed ratio when the torque transmitting mechanisms are engaged in combinations of three.

DESCRIPTION OF AN EXEMPLARY EMBODIMENT

Figures 1, 2:
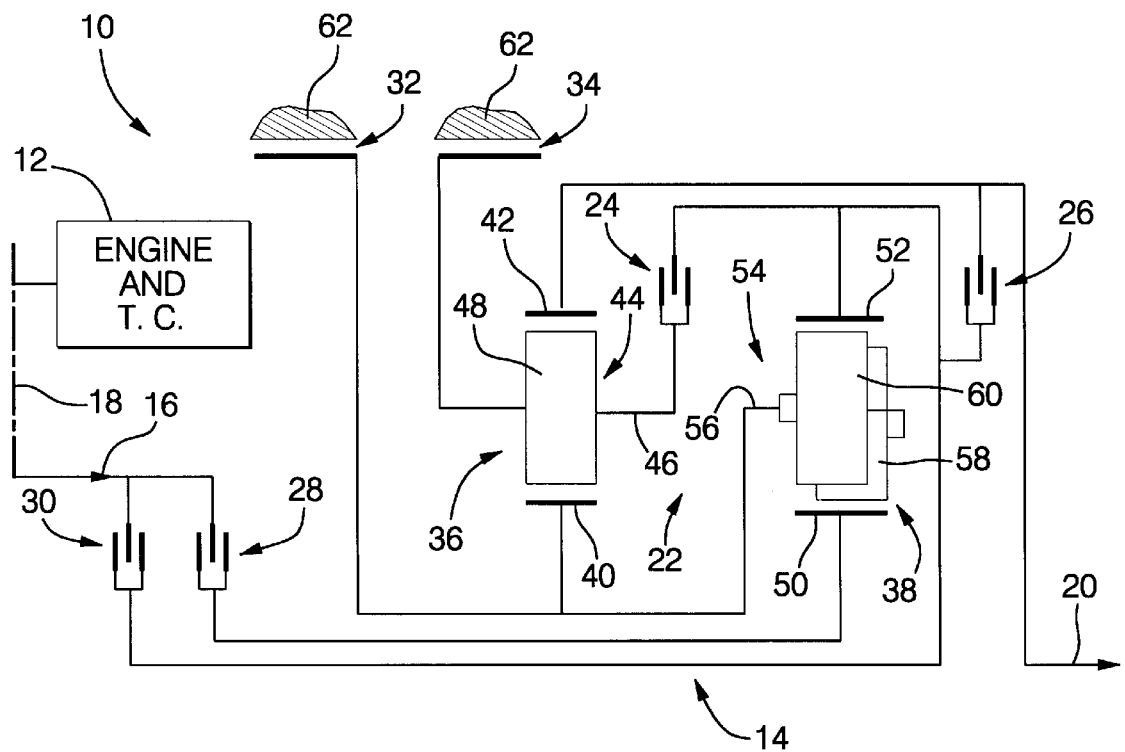
FIG. 1 is a schematic representation of a powertrain incorporating the present invention.
FIG. 2 is a table listing the speed ratios and the engagement state of the torque transmitting mechanisms for the powertrain shown in FIG. 1.

A powertrain 10 has an engine and torque converter 12 and a planetary transmission 14. The engine and torque converter 12 is a conventional assembly that is drivingly connected with an input shaft 16, of the planetary transmission 14, through a conventional transfer drive mechanism such as a chain drive 18. The planetary transmission 14 also includes an output shaft 20, a planetary gear arrangement 22, four rotating torque transmitting mechanisms or clutches 24, 26, 28, and 30, and two stationary torque transmitting mechanisms or brakes 32 and 34. The torque transmitting mechanisms 24, 26, 28, 30, 32 and 34 are preferably fluid-operated, selectively engageable friction devices, the design, operation and control of which are well known to those skilled in the art of power transmission. The clutches 24, 26, 28, and 30 are preferably of the disc type, and the brakes 32 and 34 may be of either the disc or band type.

The planetary gear arrangement 22 includes a simple planetary gear set 36 and a compound planetary gear set 38. The simple planetary gear set 36 has three rotatable members consisting of a sun gear member 40, a ring gear member 42 and a planetary carrier assembly member 44. The planetary carrier assembly member 44 includes a cage 46 on which are rotatably mounted a plurality of pinion gear members 48 that are disposed in meshing relation with the sun gear member 40 and the ring gear member 42. The compound planetary gear set 38 has three rotatable members consisting of a sun gear member 50, a ring gear member 52 and a planetary carrier assembly member 54, which includes a cage 56 on which are rotatably mounted meshing pinion gear members 58 and 60. The pinion gear members 58 also mesh with the sun gear member 50 and the pinion gear members 60 also mesh with the ring gear member 52.

The sun gear member 40 and the planetary carrier assembly member 54 are continuously interconnected and are also selectively operatively connectable with a stationary component 62 through the torque transmitting mechanism 32. The sun gear member 50 and ring gear member 52 are selectively drivingly connected with the input shaft through the torque transmitting mechanisms 28 and 30, respectively. The ring gear member 52 is also selectively connectable with the output shaft 20 and the planetary carrier assembly member 44 through the torque transmitting mechanisms 26 and 24, respectively. The planetary carrier assembly member 44 is selectively connectable with the stationary member 62 through the torque transmitting mechanism 34. The ring gear member 42 is continuously drivingly connected with the output shaft 20.

The planetary gear arrangement 14 will establish six forward speed ratios and one reverse speed ratio between the input shaft 16 and the output shaft 20 through the judicious selection of the torque transmitting mechanisms 24, 26, 28, 30, 32 and 34 in combinations of three as set forth in FIG. 2. The planetary gear arrangement 14 is in a neutral condition when all of the torque transmitting mechanisms are disengaged or when only the torque transmitting mechanisms 28 and 34 are engaged.

To establish the reverse speed ratio, the torque transmitting mechanisms 28, 30 and 34 are engaged. Since the compound planetary gear set 38 is in a direct drive condition, this combination of torque transmitting mechanisms will cause the sun gear member 40 to rotate at the speed of the input shaft 16 and the planetary carrier assembly member 44 will be held stationary. The ring gear member 42 and therefore the output shaft 20 will be driven in the direction opposite the input shaft at a reduced speed. The reverse speed ratio is determined solely by the simple planetary gear set 36.

To establish the first and lowest forward speed ratio, the torque transmitting mechanisms 26, 28 and 34 are engaged. This establishes the planetary carrier assembly member 44 as a reaction member and the sun gear member 50 as an input member. The ring gear member 52 is connected with the output shaft 20. The planetary carrier assembly member 54 and sun gear member 40 rotate at a reduced speed in a direction opposite the input shaft 16 to enforce forward rotation of the ring gear member 42 at a reduced speed. The first forward speed ratio is determined by both planetary gear sets 36 and 38. It should be noted that an interchange from reverse to forward can be made with the clutch 28 and the brake 34 remaining engaged.

To establish the second forward speed ratio, the torque transmitting mechanisms 24, 28 and 34 are engaged. The ratio interchange from first to second is a single transition event as only the torque transmitting mechanisms 26 and 24 are interchanged. It should also be noted that a reverse to second interchange is possible on a single transition basis. In the second forward speed ratio, the planetary carrier assembly member 44 and the ring gear member 52 are both stationary reaction members and the sun gear member 50 is an input member. The second forward speed ratio is determined by both of the planetary gear sets 38 and 36.

To establish the third forward speed ratio, the torque transmitting mechanisms 26, 28 and 32 are engaged. This is a double transition interchange from the second speed ratio. In the third forward speed ratio, the planetary carrier assembly member 54 is a reaction member and the sun gear member 50 is the input member. This ratio is established solely by the planetary gear set 38.

To establish the fourth forward speed ratio, the torque transmitting mechanisms 24, 28 and 32 are engaged. The planetary carrier assembly member 54 and the sun gear member 40 are both reaction members and the sun gear member 50 remains the input member. The ring gear member 52 and planetary carrier assembly member 44 are driven forwardly at a reduced ratio. The planetary carrier assembly member 44 imposes an overdrive factor at the planetary gear set 36. However, this factor is less that the underdrive factor imposed by the planetary gear set 38 such that the overall ratio is an underdrive ratio. The three/four ratio interchange is a single transition shift.

To establish the fifth forward speed ratio, the torque transmitting mechanisms 24, 28 and 30 are engaged. This is a single transition interchange from the fourth forward speed ratio. In the fifth forward speed ratio, both of the planetary gear sets 36 and 38 are in a direct drive or one-to-one ratio. Thus, the output shaft 20 rotates in the same direction and at the same speed as the input shaft 16.

To establish the sixth and highest forward speed ratio, the torque transmitting mechanisms 24, 30 and 32 are engaged.

The five/six ratio interchange is a single transition shift. The sun gear member 40 becomes a reaction member and the planetary carrier assembly member 44 becomes an input member. The sixth forward speed ratio is an overdrive ratio established solely by the planetary gear set 36.

The table in FIG. 2 sets forth a schedule of possible speed ratios values that can be attained with the present invention. To provide these ratios, the ratio of ring gear member 52 to the sun gear member 50 is 1.98 and the ratio of the ring gear member 42 to the sun gear member 40 is 2.63. This should be evident to those skilled in the art by the values of the third forward speed ratio and the reverse speed ratio, respectively. Those skilled in the art will recognize that other combinations of the torque transmitting mechanisms will provide a direct drive for the fifth ratio; however, the combination selected permits a four/five and five/six single transition interchange. It should be noted that all of the torque transmitting mechanisms are engaged in more than one ratio. The clutch 26 is engaged for two ratios, the clutch 30 and the brakes 32 and 34 are engaged during three ratios, the clutch 24 is engaged during four ratios and the clutch 28 is engaged during six ratios (five forward and reverse). Those skilled in the art will recognize that a transmission having five forward speeds can be attained by eliminating the torque transmitting mechanism 28 and directly connecting the input shaft 16 to the sun gear 50. As is apparent from FIG. 2, the torque transmitting mechanism 28 is engaged during reverse operation and also during the five lowest forward speed ratios.

What is claimed is:

1. A multi-speed planetary gear transmission comprising:

an input shaft;

an output shaft;

a simple planetary gear set having a sun gear member, a ring gear member, and a carrier assembly member, said ring gear member being continuously drivingly connected with said output shaft;

a compound planetary gear set having a sun gear member, a ring gear member, and a carrier assembly member, said carrier assembly member of said compound planetary gear set being continuously connected for common rotation with said sun gear member of said simple planetary gear set;

a first torque transmitting mechanism selectively interconnecting said ring gear member of said compound planetary gear set with said planetary carrier assembly member of said simple planetary gear set;

a second torque transmitting mechanism selectively interconnecting said ring gear member of said compound planetary gear set with said output shaft;

a third torque transmitting mechanism selectively interconnecting said input shaft with said sun gear member of said compound planetary gear set;

a fourth torque transmitting mechanism selectively interconnecting said input shaft with said ring gear member of said compound planetary gear set;

a fifth torque transmitting mechanism selectively restraining said planetary carrier assembly member of said compound planetary gear set and said sun gear member of said simple planetary gear set;

a sixth torque transmitting mechanism selectively restraining said planetary carrier assembly member of said simple planetary gear set; and said torque transmitting mechanisms being selectively operated in combinations of three to establish six forward speed ratios and a reverse speed ratio, said third torque transmitting mechanism being selectively engaged in said reverse speed ratio and five consecutive forward speed ratios;

said first torque transmitting mechanism being selectively engaged in four of said forward speed ratios; and said second, fourth, fifth and sixth torque transmitting mechanisms each being selectively engaged in at least two of said six forward speed ratios.

2. The multi-speed planetary gear transmission defined in claim 1 further comprising:

said fourth and sixth torque transmitting mechanisms also being selectively engaged in said reverse speed ratio.

3. A multi-speed planetary transmission comprising:

an input shaft;

an output shaft;

a compound planetary gear set having first, second, and third rotatable members;

a simple planetary gear set having fourth, fifth, and sixth rotatable members, said sixth rotatable member being continuously drivingly connected with said output shaft, and said fourth rotatable member being continuously drivingly connected with said second rotatable member;

first and second torque transmitting means for selectively connecting said input shaft with said first and third rotatable members, respectively;

third and fourth torque transmitting means for selectively interconnecting said third rotatable member with said fifth rotatable member and said output shaft, respectively;

fifth and sixth torque transmitting means for selectively restraining rotation of said second and fourth rotatable members, and said fifth rotatable member, respectively;

said torque transmitting means being engaged in combinations of three to establish six forward speed ratios and a reverse speed ratio between said input shaft and said output shaft, said first torque transmitting means being selectively engaged during said reverse speed ratio and five of said forward speed ratios; and said third torque transmitting means being engaged during four forward speed ratios.

4. The multi-speed planetary gear transmission defined in claim 3 further comprising:

said second and sixth torque transmitting means each being selectively engaged during said reverse speed ratio and two of said forward speed ratios;

said fifth torque transmitting means being selectively engaged during three of said forward speed ratios; and said fourth torque transmitting means being selectively engaged during two of the forward speed ratios.

5. A multi-speed planetary transmission comprising:

an input shaft;

an output shaft;

a compound planetary gear set having first, second, and third rotatable members;

a simple planetary gear set having fourth, fifth, and sixth rotatable members, said sixth rotatable member being continuously drivingly connected with said output shaft, and said fourth rotatable member being continuously drivingly connected with said second rotatable member;

first and second torque transmitting means for selectively connecting said input shaft with said first and third rotatable members, respectively;

third and fourth torque transmitting means for selectively interconnecting said third rotatable member with said fifth rotatable member and said output shaft, respectively;

fifth and sixth torque transmitting means for selectively restraining rotation of said second and fourth rotatable members, and said fifth rotatable member, respectively;

said torque transmitting means being engaged in combinations of three to establish six forward speed ratios and a reverse speed ratio between said input shaft and said output shaft, said first torque transmitting means comprising a shaft for continuously directly connecting said input shaft with said first rotatable member;

said third torque transmitting means, comprising a clutch, being selectively engaged during three forward speed ratios;

said second torque transmitting means, comprising a clutch, being selectively engaged in said reverse speed ratio and one forward speed ratio; and said fifth torque transmitting means, comprising a brake, being selectively engaged in two forward speed ratios.

* * * * *